March 20, 1956 H. GILL 2,738,712
THREE DIMENSION CONTOURING MACHINE
Filed July 9, 1953 4 Sheets-Sheet 1
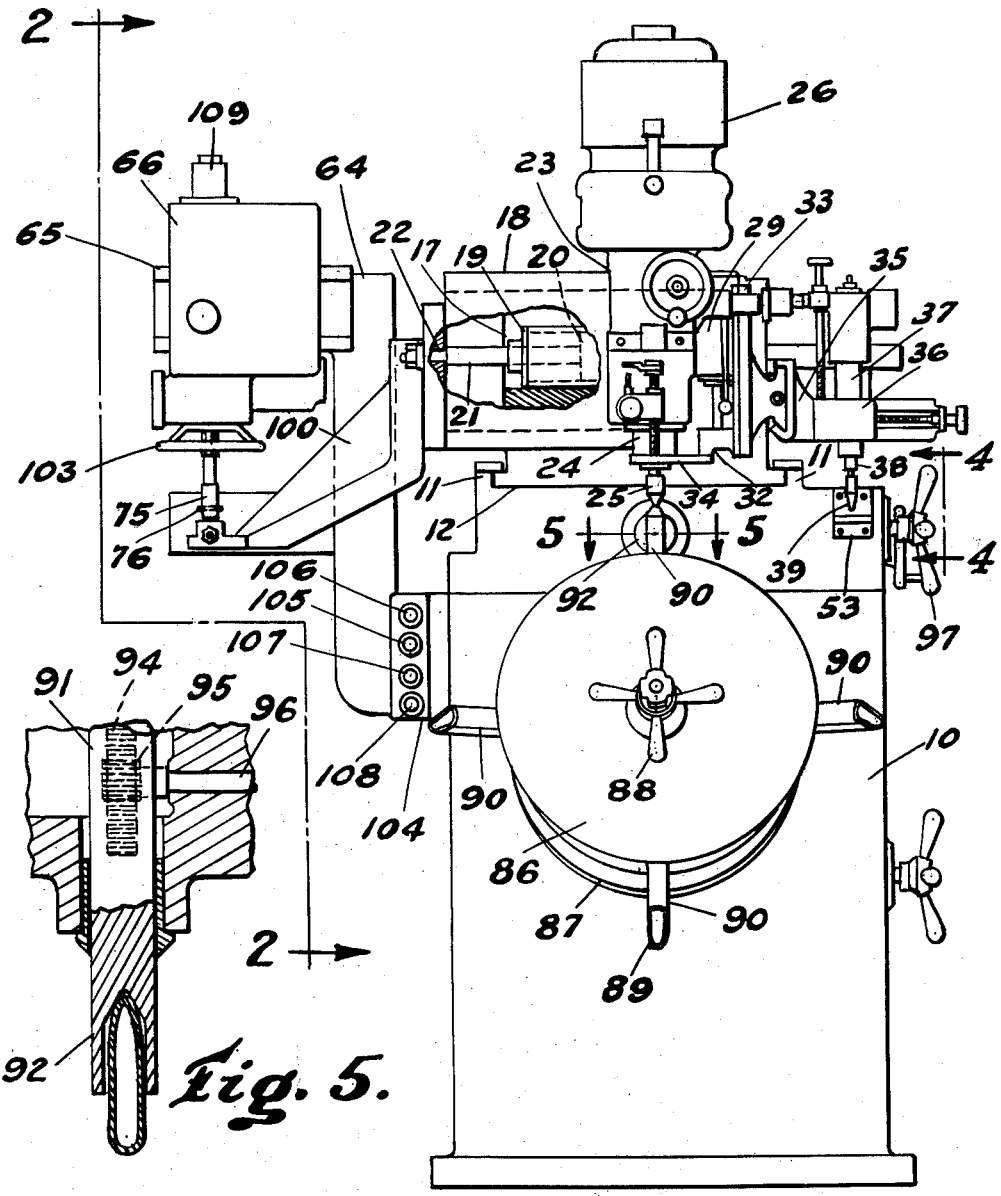
Fig. 5.
Fig. 1.
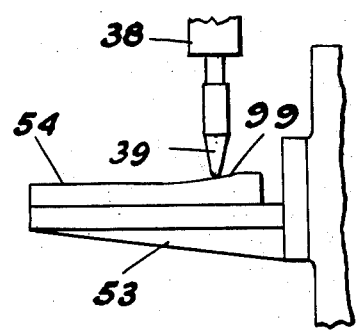
Fig. 4.
INVENTOR.
HENRY GILL
BY
H. W. Parsons & L. W. Wright,
ATTORNEYS March 20, 1956  H. GILL  2,738,712
THREE DIMENSION CONTOURING MACHINE
Filed July 9, 1953  4 Sheets-Sheet 2

INVENTOR.
HENRY GILL
BY
H. K. Parsons & C. W. Wright.
ATTORNEYS

March 20, 1956  H. GILL  2,738,712
THREE DIMENSION CONTOURING MACHINE
Filed July 9, 1953  4 Sheets-Sheet 4
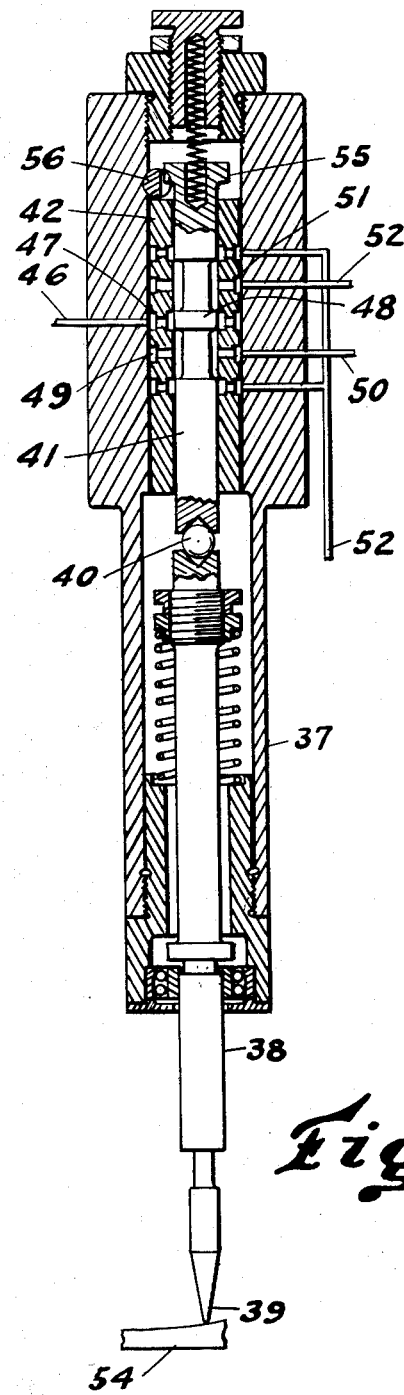
Fig. 8.
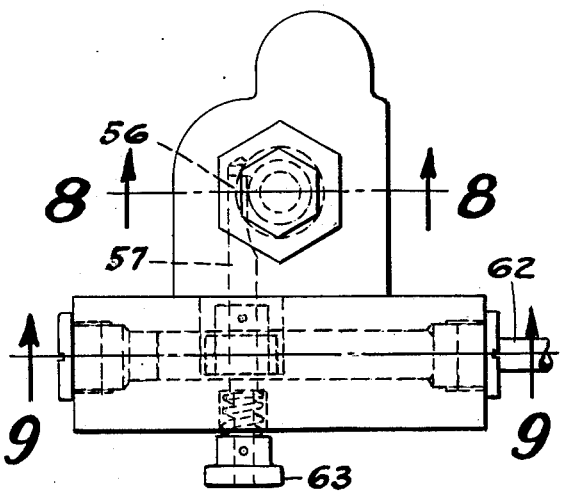
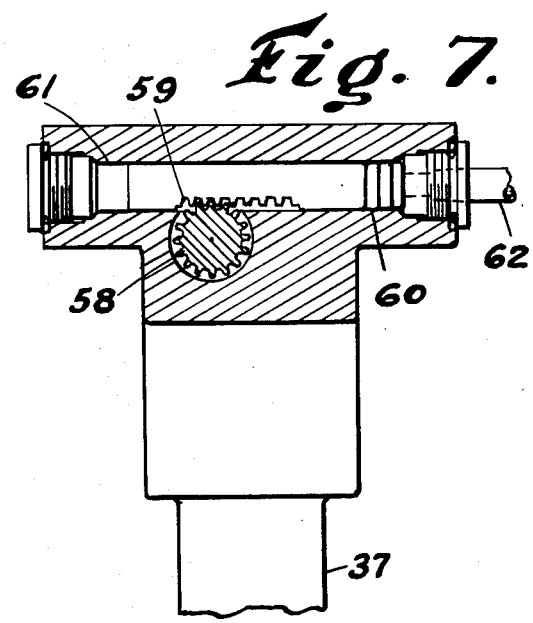
Fig. 7.
Fig. 9.
INVENTOR.
HENRY GILL
BY
H. K. Parsons & E. W. Wright.
ATTORNEYS

United States Patent Office 2,738,712
Patented Mar. 20, 1956

2,738,712

THREE DIMENSION CONTOURING MACHINE

Henry Gill, Cincinnati, Ohio, assignor to The Cincinnati Milling Machine Co., Cincinnati, Ohio, a corporation of Ohio Application July 9, 1953, Serial No. 366,931

8 Claims. (Cl. 90—13.5)

This invention relates to improvements in pattern controlled machine tools and has particular reference to a profiling or contouring type of milling machine.

One of the principal objects of the present invention is the provision of an improved tracer controlled milling machine or other machine tool for three-dimensional control of the relative movements of cutter and work piece during the machining operation.

A further object of the present invention is the provision of an improved manner of mounting the tracer mechanism for control of contouring movements of the machine to minimize the weight and mass of parts which move under control of the tracer.

A further object of the invention is the provision of an improved machine embodying generally effective pattern controlled tracer mechanisms for determining the contouring movement and the movement in depth of the cutter during a reproducing operation and which shall embody safety interlock mechanism reducing the possibility of damage to a work piece by the cutter.

An additional object of the present invention is the provision of an improved construction of machine tool and relationship of parts of such tool for facilitating ready and accurate positioning of the work to be operated upon and performance of the three-dimensional cutting operations as respects the positioned work piece.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1 is a front elevation of a machine embodying the present invention.

Figure 4 is a fragmentary elevation of the depth control pattern and tracer viewed as indicated by the arrows 4—4 in Figure 1.

Figure 5 is a fragmentary horizontal section on the line 5—5 of Figure 1.

Figure 7 is a plan view of the depth control tracer head.

Figure 8 is a vertical section through the depth control tracer head,

Figure 9 is a fragmentary sectional view on the line 9—9 of Figure 7.

Figure 2:
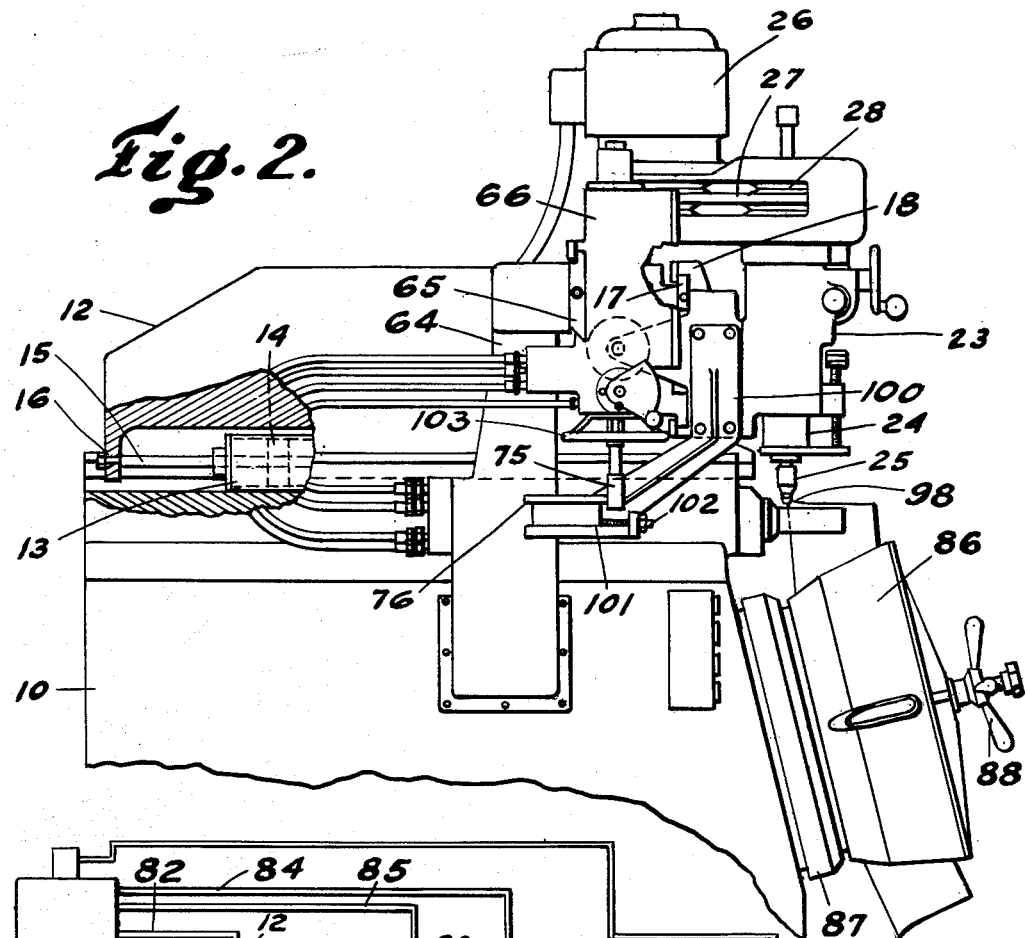
Figure 2 is a side elevation looking in the direction of the arrows 2—2 of Figure 1.

In the drawings the numeral 10 designates the bed of a milling machine embodying the present invention which is provided with the ways 11 for guiding the ram 12 for in and out movement with respect to the bed. A hydraulic cylinder 13 carried by the bed contains piston 14 having the piston rods 15 secured to the ram as at 16. The ram is, in turn, provided with the transverse ways 17 on which is mounted the cross slide 18. A cylinder 19 carried by the ram contains piston 20 having the piston rods 21 coupled to the slide 18 as at 22.

The cross slide supports spindle carrier 23 reciprocably mounting the quill 24 for a spindle carrying the cutter 25. A drive motor 26 on the slide 18 is connected by a belt 27 with pulley 28 for rotating the spindle and cutting tool 25 in a conventional maner. The hydraulic cylinder 29 is secured to the slide 18 containing the piston 30 connected by piston rod 31 with lug 32 on the vertically movable tracer supporting slide 33. This lug is connected to arm 34 on the quill 24 for effecting vertical movement of the arm in accordance with the actuation of the piston.

Carried by the slide 33 for forward and back positioning adjustment is the arm 35, in turn supporting the transversely adjustable slide block 36 which supports the depth control tracer head 37. These connections provide for desired positioning adjustments of the depth control tracer. Supported in the head 37 for vertical and oscillatory movement is the tracer spindle 38 carrying at its lower end the tracer finger 39. At its upper end the tracer spindle reacts against the ball 40 for effecting longitudinal movement of the valve 41 within the ported valve bushing 42.

The hydraulic operating circuit for the machine includes a pressure pump 43 supplied from reservoir 44 and the pressure conduit 45 having a branch 46 ported into the valve bushing 42 at 47. The valve itself has the intermediate spool 48 which when upwardly displaced couples pressure through valve porting 49 with conduit 50 reacting in cylinder 29 to effect upward movement of the piston and thus of the quill and cutter, while when the spool is displaced downwardly pressure is connected by valve porting 51 to conduit 52 extending to the upper end of the cylinder for moving the cutter and quill downward. When pressure is connected to either conduit 50 or 52 the other conduit is connected by the valve to reservoir conduit 52'. Carried by the bed 10 is a stationary pattern supporting bracket 53 adapted to receive a pattern 54 for engagement with the tracer finger 39. Consequently, scanning of the surface of pattern 54 by the finger 39 during in and out movement of the ram and movements of the cross slide 18 will automatically determine the position of the finger 39 and its reaction on valve 41 for control of the vertical movements of the cutter 25. At its upper end the valve 41 is provided with a lifter flange 55 engageable by the cam 56 on rock shaft 57. Shaft 57 is provided with the toothed or pinion portion 58 engaging rack 59 on piston 60 slidable in cylinder 61. A hydraulic conduit 62 extends from one end of the cylinder 61 to the contouring tracer mechanism which determines the activation of the conduit in a manner hereinafter described. When this conduit is activated the hydraulic pressure will move the piston to the left as viewed in Figure 9, raising valve 41 so that pressure is introduced into conduit 50, causing upward movement or retraction of the cutting tool. Upon relief of pressure in 62, the shaft 57 may be manually rocked in a reverse direction by the control knob 63, reconditioning the depth tracer mechanism for automatic operation. It will, of course, be understood that at any time that it is desired to raise the cutter, this may be effected by lifting or raising the valve 41 by rotation of knob 63.

Figure 6:
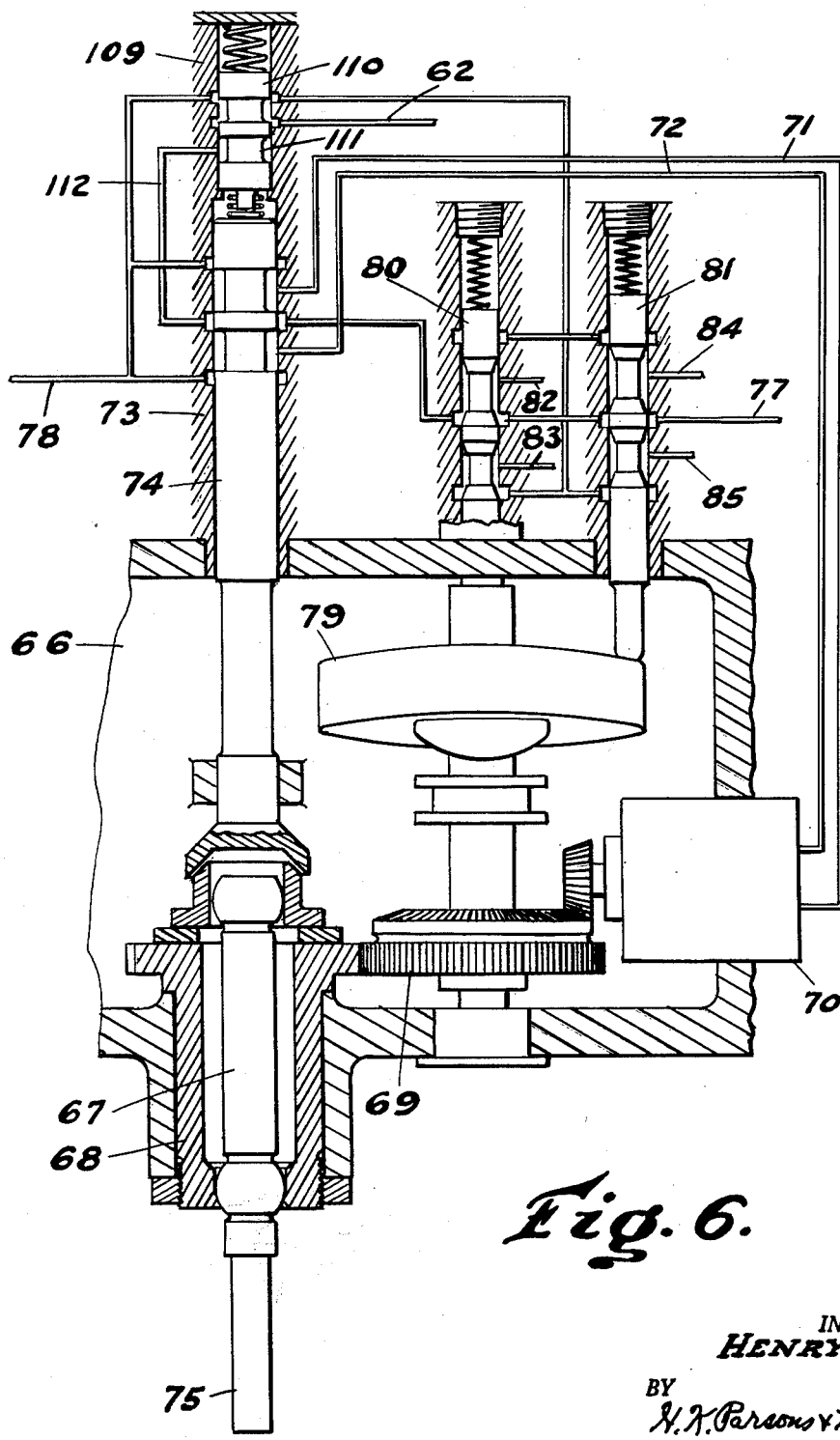
Figure 6 is a vertical sectional view through the profiling control tracer head.

Secured at the left hand side of the bed 10 is the supporting bracket 64 having the ways 65 adjustably mounting the head structure of the profile control tracer unit 66. The tracer mechanism here utilized may be of any desired conventional type but, as illustrated, is that shown in co-pending application, Serial No. 359,311. Mounted in this tracer head structure, as shown in Figure 6, is the oscillatable tracer 67 deflectable relative to the head structure and mounted in the rotatable bushing 68 driven through gearing 69 by the hydraulic motor 70. This motor is coupled by conduits 71, 72 with the bushing 73 for the tracer controlled valve 74 whose position is determined by deflection or absence of deflection of the tracer 67 in accordance with deflections of the tracer finger 75 effected by movements of the pattern 76. Pressure conduit 77 is coupled with the valve bushing 73 and, as indicated, alternatively connected by valve with other motor conduit 71 or motor conduit 72, depending on the movement of valve 74 from its neutral position, the opposite motor conduit being connected by the valve with reservoir conduit 78. Additionally contained within the tracer head unit 66 and driven by the gearing 69 is the rate and direction control cam 79 determining the positionings of the valves 80 and 81. The valve 80 in accordance with its cam determined position controls coupling of the pressure line 77 with either conduit 82 or conduit 83 extending to the cylinder 13 for the ram operating piston 14 while coupling the opposite conduit to reservoir. Likewise, the valve 81 correspondingly controls the coupling of pressure through conduit 84 or conduit 85 to cylinder 19 for the cross slide piston 20 while coupling the other conduit to reservoir. In this manner the extent and direction of movement of piston 20 and connected cross slide 18 is determined by the valve 81.

In the operation of the machine a work piece, such as the rotor 86, is mounted on the positioning trunnion 87 mounted on the bed 10 of the machine and is locked in position as by clamp mechanism 88. The particular operation here to be performed is the finishing of the profile terminal surface 89 of the plurality of nozzles 90.

For proper location of the work, slidably mounted in the bed is the work positioning plunger 91 having a fork at 92 to receive and interlock with the exterior of one of the members 90. This plunger is formed with a rack at 94 meshing with pinion 95 on shaft 96 which is provided with a pilot wheel 97 for projecting or retracting the work holder.

By reference to Figures 1, 2, and 5 it will be noted that the work piece, as an entirety, has a quasi oval outline as indicated at 89 rising rearwardly as respects its mounted position in the machine in the lip 98.

For control of the operation of the machine the cam 54 has the upwardly inclined portion 99 so that as respects the horizontal plane or plane of movement of the ram 12, the upper surface contour of the cam 54 corresponds to the deviations from the plane of movement of the ram to be reproduced on the work piece by the cutter 25. As before mentioned, this cam is rigidly mounted on the bed 10 in definite relation to the work piece support for engagement with the vertical movement control tracer finger 39.

Secured to one end of the cross slide 18 is the extension or bracket 100 which is shown as inclined downwardly to provide a supporting surface at 101 for the pattern 76 which may be locked in position by clamp screw 102. The pattern will therefore move transversely with the cross slide 18 and at the same time be given a forward and back movement in accordance with the movements of the ram 12.

As is conventional in tracer head constructions of the type illustrated, there is provided the hand steering wheel 103 by which in starting operation of the machine the valving in the tracer head may be so adjusted as to cause movement in a selected direction of the pattern towards the tracer finger. Upon contact between the pattern and tracer finger valve 74 will operate the orientation motor 70 and adjust the valves 80 and 81 so that the pattern as a result of the combined movements of the arm and cross slide will be following a tangent path with respect to the tracer finger contact. Any deviation in the path resulting in a rise in the outline of the cam will effect overdeflection of the tracer with immediate reaction on cam 79 and valves 80—81 to cause a movement of the ram and cross slide in directions away from the tracer to compensate for the rise on the pattern. Conversely, any depression or recession of the contour will tend to relieve the tracer, causing opposite movement of the valve 74 and thus the control parts to cause the pattern to move in the direction of the tracer until it is shifted to its neutral position. In this manner, the edge of the cam 76 will move in an ambulatory path with respect to the axis of the fixed tracer head while due to the action of the deflectable tracer finger and controlled motor 70 the tracer finger support bushing 68 will be continuously oriented to maintain a constant tangential engagement between the tracer finger and the edge of the cam so that the path of movement of the cutter 25 will exactly correspond with the outline of its connected pattern.

For control of the machine there has been shown, as provided, on the bed 10 the panel 104 carrying the starting button 105, stop button 106, spindle control button 107 and rate adjuster 108.

When one of the work nozzles 90 has been completed, the machine is stopped, clamp 88 loosened, work holding yoke 92 retracted and the member 86 rotated to bring another nozzle 30 into operative machining position whereupon the plunger 91 is projected and the clamp 88 tightened to hold the work for the succeeding operation.

Attention is invited to the particularly advantageous feature of the present construction in that the contour control tracer head 66 and its various contained parts including the tracer mechanism, tracer drive motor, rate and direction selector valves and the like are formed as a unit adjustably mounted on a heavy bracket portion of the bed in place of being carried by the ram or cross slide as has been conventional in machines of this type in the past. As a result, this rather heavy and complicated mechanism is rigidly mounted and positioned and the weight of control structure on the moving slide or slides greatly reduced, transmission of vibration between tracer and finger and cutter is minimized and the burden put on the moving slides of only the weight of the light bracket arm 100 and tracer controlling pattern. At the same time that the 360 degree or contouring operation is thus controlled, the light and simplified tracer mechanism for depth control is carried and directly associated with the moving spindle unit involving a minimum of dead weight so far as the supporting slides are concerned and necessitating but simply a light weight part for control of the supplemental vertical quill movement. Also, the vertical movement is controlled by a pattern member rigidly mounted immediately adjacent the cutting tool and its transverse slides so that the tool itself moves up and down with respect to the bed as dictated by this pattern while the joint ambulatory movement effected by actuation of the slides is under control of the power unit tracer mechanism in the head 66 which is itself rigidly mounted and supported by the bed.

Figure 3:
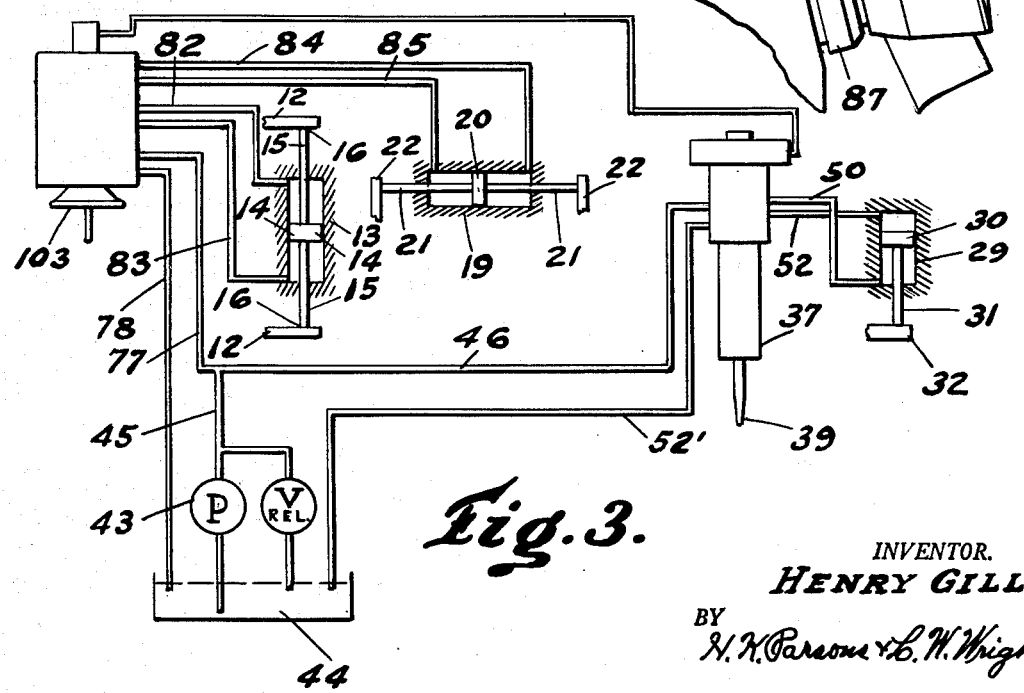
Figure 3 is a simplified hydraulic diagram showing the essential operative hydraulic connections for actuation of the machine.

To avoid possible damage to the parts of the machine or to the work in the event of tendency of movement effecting an overdeflection of the tracer finger 75 there has been provided at the top of the tracer head 66 the sleeve or extension 109 containing supplemental valve 110 having a groove 111 to which is coupled through sleeve 109 the pressure line 112. Upon overdeflection of tracer finger 75 and consequent pronounced upward movement of valve 74, the valve 110 will be raised to a position in which the groove 111 will couple pressure to conduit 62 as previously illustrated and described in connection with Figure 3. As described, this pressure will react against piston 60, lifting valve 41 so that the pressure introduced through conduit 50 will immediately raise piston 30 and retract the cutter with respect to the work.

From the foregoing description the construction and operation of the machine of the present invention should be readily understood, and it will be seen that there has been provided a compact and efficient machine embodying relatively light, freely moving slides operating in directions at right angles one to another for determining the contour to be followed by a supported cutter as dictated by a pattern associated with said slides and reacting against a tracer structure rigidly mounted on the bed of the machine. It will further be noted that there has been provided in conjunction with such contouring control a depth or vertical movement control for the cutter of light and efficient construction in which the control member rigidly carried by the bed of the machine serves to determine the up and down movement of the cutter spindle during its general ambulatory movement as dictated by the cross movements of ram and cross slide, and that at the same time there has been provided an interlock control between the fixed contour controlling tracer unit on the bed and the ambulatory vertical movement control mechanism on the cross slide such that any pronounced deflection of the contour movement control mechanism will react to cause a retraction of the cutter with respect to the work piece.

It will further be noted that there has been provided an improved and simplified mechanism for rotary positioning individual portions of a work piece in proper relationship to the cutting spindle for performance of the tooling operation.

It will be understood that for production of symmetrical parts, the outline and position of the finished work surface will correspond to that of the pattern. However, for non-symmetrical outlines, the contour produced on the work will be reversed as respects the pattern, use then being made, for example, of a reversed or left hand pattern for production of a right hand contour on the work.

What is claimed is:

1. A three-dimensional contour producing machine comprising a bed, a ram slidable on the bed, a cross slide carried by the ram, a contour pattern supporting arm carried by the cross slide, a tool carried by the cross slide and movable relative thereto, a profile controlling tracer unit carried by the bed including a head and a tracer finger disposed for cooperation with a pattern on the pattern arm and deflectable relative to the head, operative connections between the profile controlling tracer head and the ram and the cross slide for controlling movements of the ram and cross slide in accordance with deflections of the tracer finger, a pattern support carried by the bed, a tracer control head carried by the cross slide and including a tracer finger for cooperation with a pattern on the pattern support carried by the bed, and operative connections between the last-mentioned tracer head and the tool support for shifting the tool relative to the cross slide in accordance with deflections of the tracer finger of said last-mentioned tracer head, during profile controlling tracer unit controlled movements of the ram and slide.

2. A three-dimensional contour producing machine comprising a bed, a ram slidable on the bed, a cross slide carried by the ram, a contour pattern supporting arm carried by the cross slide, a tool carried by the cross slide and movable relative thereto, a profile controlling tracer unit carried by the bed including a head and a tracer finger disposed for cooperation with a pattern on the pattern arm and deflectable relative to the head, operative connections between the profile controlling tracer head and the ram and the cross slide for controlling movements of the ram and cross slide in accordance with deflections of the tracer finger, a pattern support carried by the bed, a tracer control head carried by the cross slide and including a tracer finger for cooperation with a pattern on the pattern support carried by the bed, and operative connections between the last-mentioned tracer head and the tool support for shifting the tool relative to the cross slide in accordance with deflections of the tracer finger of said last-mentioned tracer head, said last-mentioned tracer head including a valve shiftable by movements of the tracer finger, and operative connections between said valve and the profile controlling tracer unit for effecting shifting of the valve upon deflection of the contact finger of the profile controlling tracer unit relative to the head of the unit.

3. A three-dimensional contouring machine including a bed, a work support carried by the bed, a ram slidable on the bed, a cross slide movable on the ram, a pattern carrier mounted on the cross slide, a contour controlling tracer head carried by the bed having a tracer finger for cooperation with a pattern on the pattern holder and deflectable by movements of a pattern on the pattern holder, operative connections between said tracer head and the ram for determining movement of the ram in accordance with deflections of the tracer finger, additional operative connections between the tracer head and the cross slide for effecting movements of the cross slide in accordance with deflections of the tracer finger, a cutting tool carried by the cross slide and mounted for movement relative to the slide, a second tracer head carried by the cross slide and including a pattern contacting finger, operative connections between the said second tracer head and the tool for effecting movement of the tool relative to the cross slide in accordance with deflections of the tracer finger with respect to said second tracer head, a pattern holder carried by the bed in position to support a pattern for engagement with the tracer finger of said second tracer head, whereby contouring tracer head controlled movements of the ram and cross slide will shift the tracer finger of the second tracer head in an ambulatory path with respect to the pattern holder on the bed for control of the movement of the tool relative to the slide, and operative connections between the contour determining tracer head and said second tracer head for effecting movement of the tool relative to its supporting slide independently of the movement effectible by deflection of the tracer finger of said second tracer head.

4. A three-dimension contour producing machine including a bed, a ram movable on the bed, a cross slide carried by the ram, and a tool mounted on the cross slide for bodily movement relative to said slide, a work holder carried by the bed, a pattern holder carried by the bed in fixed relation to said work holder, a contour controlling tracer head carried by the bed in fixed relation to said work holder, a contour pattern support carried by the slide and extending in the direction of the contour tracer head carried by the bed, said tracer head having a pattern contacting finger projecting into position for engagement with a pattern on the support movable with the slide, a second tracer head carried by the slide having a pattern contacting finger extending in the direction of the pattern holder on the bed for engagement and control by a pattern on said pattern holder, and operative connections between said second tracer head and the tool support for effecting movement of the tool support relative to the slide.

5. A three-dimension contour producing machine including a bed, a ram movable on the bed, a cross slide carried by the ram, and a tool mounted on the cross slide for bodily movement relative to said slide, a work holder carried by the bed, a pattern holder carried by the bed in fixed relation to said work holder, a contour controlling tracer head carried by the bed in fixed relation to said work holder, a contour pattern support carried by the slide and extending in the direction of the contour tracer head carried by the bed, said tracer head having a pattern contacting finger projecting into position for engagement with a pattern on the support movable with the slide, a second tracer head carried by the slide having a pattern contacting finger extending in the direction of the pattern holder on the bed for engagement and control by a pattern on said pattern holder, and operative connections between said second tracer head and the tool support for effecting movement of the tool support relative to the slide, said second tracer head including a valve shiftable by movement of the tracer finger of said second tracer head, and a lifting device mounted on said second tracer head having a portion engaging the valve for effecting movement of the valve independently of the tracer finger effected movement thereof.

6. A three-dimension contour producing machine including a bed, a ram movable on the bed, a cross slide carried by the ram, and a tool mounted on the cross slide for bodily movement relative to said slide, a work holder carried by the bed, a pattern holder carried by the bed in fixed relation to said work holder, a contour controlling tracer head carried by the bed in fixed relation to said work holder, a contour pattern support carried by the slide and extending in the direction of the contour tracer head carried by the bed, said tracer head having a pattern contacting finger projecting into position for engagement with a pattern on the support movable with the slide, a second tracer head carried by the slide having a pattern contacting finger extending in the direction of the pattern holder on the bed for engagement and control by a pattern on said pattern holder, and operative connections between said second tracer head and the tool support for effecting movement of the tool support relative to the slide, said second tracer head including a valve shiftable by movement of the tracer finger of said second tracer head, and a lifting device mounted on said second tracer head having a portion engaging the valve for effecting movement of the valve independently of the tracer finger effected movement thereof, said lifter device including a hydraulically actuable piston, and hydraulic connections between the first tracer head and said piston for effecting activation of the piston under control of said first tracer head.

7. A three-dimension contour producing machine including a bed, a ram movable on the bed, a cross slide carried by the ram, and a tool mounted on the cross slide for bodily movement relative to said slide, a work holder carried by the bed, a pattern holder carried by the bed in fixed relation to said work holder, a contour controlling tracer head carried by the bed in fixed relation to said work holder, a contour pattern support carried by the slide and extending in the direction of the contour tracer head carried by the bed, said tracer head having a pattern contacting finger projecting into position for engagement with a pattern on the support, a second tracer head carried by the slide having a pattern contacting finger extending in the direction of the pattern holder on the bed for engagement and control by a pattern on said pattern holder, operative connections between said second tracer head and the tool support for effecting movement of the tool support relative to the slide, said second tracer head including a valve shiftable by movement of the tracer finger of said second tracer head, and a lifting device mounted on said second tracer head having a portion engaging the valve for effecting movement of the valve independently of the tracer finger effected movement thereof, said lifting device including a hydraulically actuable piston, and hydraulic connections between the first tracer head and said piston for effecting activation of the piston under control of said first tracer head, and independent manually operable means for effecting movement of the piston.

8. A three-dimension contour controlling machine including a bed, a work support on the bed, a ram movable on the bed, a cross slide movable on the ram and a tool movably supported by the cross slide, and means for controlling the relative movements of the ram, cross slide, and tool with respect to the work support on the bed, including a first tracer mechanism carried by the bed, a pattern support carried by the cross slide for maintaining a pattern in operative relation to the first tracer mechanism, a second tracer mechanism carried by the cross slide, and a pattern support carried by the bed in position to support a second pattern in cooperating relation to the second tracer mechanism, operative connections between one of said tracer mechanisms and said ram and cross slide for controlling their respective movements, and additional operative connections between the other of said tracer mechanisms and the tool holder variably to position the tool holder with respect to the slide during the tracer controlled movements of the ram and slide.

References Cited in the file of this patent

UNITED STATES PATENTS

| | | |
|---|---|---|
| 2,332,532 | Roehm | Oct. 26, 1943 |
| 2,389,653 | Turchan et al. | Nov. 27, 1945 |
| 2,471,097 | Dall et al. | May 24, 1949 |